US008005800B2

United States Patent
Spear et al.

(10) Patent No.: US 8,005,800 B2
(45) Date of Patent: *Aug. 23, 2011

(54) DATA STORAGE SYSTEM FOR FAST REVERSE RESTORE

(75) Inventors: Gail Andrea Spear, Tucson, AZ (US); Michael E. Factor, Haifa (IL); Rivka Mayraz Matsoevich, Zichron-Ya'acov (IL); Shachar Fienblit, Ein Ayala (IL); Sheli Rahav, Haifa (IL); Robert Francis Bartfai, Tucson, AZ (US); Dalit Tzafir, Haifa (IL); Ifat Nuriel, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,148

(22) Filed: Oct. 29, 2010

(65) Prior Publication Data

US 2011/0047343 A1 Feb. 24, 2011

Related U.S. Application Data

(63) Continuation of application No. 12/255,575, filed on Oct. 21, 2008, now Pat. No. 7,856,425, which is a continuation of application No. 10/856,239, filed on May 27, 2004, now Pat. No. 7,461,100.

(51) Int. Cl.
*G06F 17/20* (2006.01)
*G06F 15/16* (2006.01)
(52) U.S. Cl. .......................... 707/678; 707/679; 707/681
(58) Field of Classification Search .................. 707/679, 707/678, 681
See application file for complete search history.

(56) References Cited

U.S. PATENT DOCUMENTS

| 5,835,954 A | 11/1998 | Duyanovich et al. |
| 5,884,328 A | 3/1999 | Mosher, Jr. |
| 6,058,054 A | 5/2000 | Islam et al. |
| 6,131,148 A | 10/2000 | West et al. |
| 6,253,295 B1 | 6/2001 | Beal et al. |
| 6,442,709 B1 | 8/2002 | Beal et al. |
| 6,446,176 B1 | 9/2002 | West et al. |

(Continued)

FOREIGN PATENT DOCUMENTS

JP 2000298554 10/2000

(Continued)

OTHER PUBLICATIONS

IBM Corporation, "Single Subsystem PPRC Copy", Research Disclosure, vol. 42, No. 418, Article 41888, Feb. 1999, p. 264.

(Continued)

*Primary Examiner* — Robert Stevens
*Assistant Examiner* — Alex Gofman
(74) *Attorney, Agent, or Firm* — Janaki K. Davda; Konrad Raynes & Victor LLP

(57) ABSTRACT

Techniques are provided for performing a copy operation. A fast reverse restore command indicating a new source and a new target is received, wherein the new source is an original target and the new target is an original source. A synchronous scan is performed on the new target. A new target structure associated with the new target is updated using a new source structure associated with the new source. Techniques are also provided for performing a copy operation in which a fast reverse restore command is received after an instant virtual copy has been performed from a new target to a new source and wherein the fast reverse restore command is performed before a background copy has been performed by the instant virtual copy.

11 Claims, 11 Drawing Sheets

U.S. PATENT DOCUMENTS

| | | | |
|---|---|---|---|
| 6,499,112 B1 | 12/2002 | Milillo et al. |
| 6,557,089 B1 | 4/2003 | Reed et al. |
| 6,611,901 B1 | 8/2003 | Micka et al. |
| 6,996,586 B2 | 2/2006 | Stanley et al. |
| 7,000,145 B2 | 2/2006 | Werner et al. |
| 7,124,323 B2 | 10/2006 | Sanchez et al. |
| 7,240,241 B2 | 7/2007 | Oka |
| 7,409,510 B2 | 8/2008 | Werner et al. |
| 7,461,100 B2 | 12/2008 | Spear et al. |
| 2002/0078296 A1 | 6/2002 | Nakamura et al. |
| 2002/0133512 A1 | 9/2002 | Milillo et al. |
| 2003/0033494 A1 | 2/2003 | Fujibayashi et al. |
| 2003/0110471 A1 | 6/2003 | Asco et al. |
| 2003/0158869 A1 | 8/2003 | Micka |
| 2003/0177321 A1 | 9/2003 | Watanabe |
| 2003/0187887 A1 | 10/2003 | Beal |
| 2009/0187613 A1 | 7/2009 | Spear et al. |

FOREIGN PATENT DOCUMENTS

| | | |
|---|---|---|
| JP | 2002215334 | 8/2002 |
| JP | 2004046435 | 2/2004 |

OTHER PUBLICATIONS

EMC Corporation, "EMC TimeFinder: Create Mirror Images of Active Production Data." [online] © EMC Corporation, [Retrieved on May 13, 2003], retrieved from the Internet at <URL: http://www.emc.com/products/software/timefinder.jsp>.

EMC Corporation, "EMC TimeFinder: Data Sheet", [online], © 2003 Corporation, [Retrieved on May 13, 2003], retrieved from the Internet at <URL: http://www.emc.com/products/product_pdfs/ds/timefinder_1700-4.pdf>.

EMC Corporation, "EMC TimeFinder Product Description Guide", [online], © 1998 EMC Corporation, pp. 1-32, [Retrieved on May 13, 2003], retrieved from the Internet at <URL: http://www.emc.com/products/product_pdfs/pdg/timefinder_pdg.pdf>.

Hitachi Data Systems Corporation, "CARE—the Copy Suite", [online] © 1999 Hitachi Data Systems Corporation, [Retrieved on May 13, 2003], retrieved from the Internet at <URL: http://www.hds.com/pdf/shadowim_flyer.pdf>.

Hitachi Data Systems Corporation, "NanoCopy", [online] © 2001 Hitachi Data Systems Corporation, [Retrieved on May 13, 2003], retrieved from the Internet at <URL: http://www.hds.com/pdf/hitachinano.pdf>.

Storage Technology Corporation, "Storage Tek SnapShot", [online] © 2001 Storage Technology Corporation, [Retrieved on May 13, 2003], retrieved from the Internet at <URL: http://www.storagetek.com/prodserv/pdfs/SnapShot.ms2010be-pBRO6_01.pdf>.

Partial English translation of Japanese Office Action dated Nov. 2, 2010 for Japanese Application No. JP2005-150607, pp. 1.

T. Matsuyama, "Use & Selection", Nikkei Open System, vol. 103, Japan, Nikkei Business Publications, Inc., Oct. 15, 2001, pp. 134-141.

H. Komori, How to Obtain Super Infrastructure (storage), Monthly solution IT, vol. 17, No. 9, Japan, RIC Telecom, Sep. 1, 2005, pp. 17-27.

First Office Action IFW dated Dec. 12, 2006, pp. 1-15, for U.S. Appl. No. 10/856,239, filed by inventors R.F. Bartfai, et al.

Response IFW dated Apr. 10, 2007, pp. 1-20, to First Office Action IFW dated Dec. 12, 2006, pp. 1-15, for U.S. Appl. No. 10/856,239, filed by inventors R.F. Bartfai, et al.

Final Office Action IFW dated Jun. 28, 2007, pp. 1-14, for U.S. Appl. No. 10/856,239, filed by inventors R.F. Bartfai, et al.

Response IFW dated Sep. 17, 2007, pp. 1-16, to Final Office Action IFW dated Jun. 28, 2007, pp. 1-14, for U.S. Appl. No. 10/856,239, filed by inventors R.F. Bartfai, et al.

Third Office Action IFW dated Jan. 2, 2008, pp. 1-6, for U.S. Appl. No. 10/856,239, filed by inventors R.F. Bartfai, et al.

Response IFW dated Apr. 2, 2008, pp. 1-7, to Third Office Action IFW dated Jan. 2, 2008, pp. 1-6, for U.S. Appl. No. 10/856,239, filed by inventors R.F. Bartfai, et al.

Notice of Allowance IFW dated Jul. 11, 2008, pp. 1-7, for U.S. Appl. No. 10/856,239, filed by inventors R.F. Bartfai, et al.

Notice of Allowance IFW dated Aug. 13, 2010, pp. 1-11, for U.S. Appl. No. 12/255,575, filed by inventors R.F. Bartfai, et al.

Nonvolatile Cache 118

Out of Sync Structure(s) 310

FIG. 3

Nonvolatile Cache 144

Storage B Structure(s) 410

Storage C Structure(s) 420

Out of Sync Structure(s) 430

FIG. 4

DATA STORAGE SYSTEM FOR FAST REVERSE RESTORE

CROSS-REFERENCE TO RELATED APPLICATIONS

This application is a continuation of and claims the benefit of U.S. Pat. No. 7,856,425, entitled "ARTICLE OF MANUFACTURE AND SYSTEM FOR FAST REVERSE RESTORE", having application Ser. No. 12/255,575, filed Oct. 21, 2008, which is a continuation of and claims the benefit of U.S. Pat. No. 7,461,100, having application Ser. No. 10/856,239, filed May 27, 2004, the entire contents of each of which is incorporated herein by reference.

BACKGROUND

1. Field

Implementations of the invention relate to a fast reverse restore operation.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Some disaster recovery systems address data loss over a period of time, in which case writes to volumes on data storage may be lost. The writes may update data, write new data, or write the same data again. To assist in recovery of data writes, a copy of data may be provided at a remote location. Such copies may also be referred to as dual or shadow copies. International Business Machines Corporation (IBM), the assignee of the subject patent application, provides remote mirroring systems, including a Peer-to-Peer Remote Copy (PPRC) service (e.g., a PPRC Extended Distance service or a synchronous PPRC service) and an Extended Remote Copy (XRC) service in an Enterprise Storage Server® (ESS) system.

The remote mirroring systems provide techniques for mirroring data in order to facilitate recovery after a system failure. Such data shadowing systems can also provide an additional remote copy for non-recovery purposes, such as local access at a remote site.

In remote mirroring systems, data is maintained in volume pairs. A volume pair is comprised of a volume in a primary storage device and a corresponding volume in a secondary storage device that includes a copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

Volumes in the secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistency transaction set is a collection of updates to the primary volumes such that dependent writes are secured in a consistent manner. Consistency groups maintain data consistency across volumes.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata in structures, such as relationship tables or pointers, to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set (e.g., either logically or physically) when the corresponding track is established as a target track of a FlashCopy® relationship. The target bit is reset when the corresponding track has been copied from the source location and destaged to the target device due to writes on the source or the target device, or a background copy task.

Further details of the FlashCopy® operations are described in the commonly assigned U.S. Pat. No. 6,611,901, issued on Aug. 26, 2003, with U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

Once the logical relationship is established, hosts may then have immediate access to data on the source and target volumes, and the data may be copied as part of a background operation. A read to a track that is a target in a FlashCopy® relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FlashCopy® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Although the instant virtual copy techniques, such as FlashCopy® operations, are useful for copying data, conventional instant virtual copy techniques may be improved.

SUMMARY OF THE INVENTION

Provided are an article of manufacture, system, and method for performing a copy operation. A fast reverse restore command indicating a new source and a new target is received, wherein the new source is an original target and the new target is an original source. A synchronous scan is performed on the new target. A new target structure associated with the new target is updated using a new source structure associated with the new source.

Also provided are an article of manufacture, system, and method for performing a copy operation in which a fast reverse restore command is received after an instant virtual copy has been performed from a new target to a new source and wherein the fast reverse restore command is performed before a background copy has been performed by the instant virtual copy.

BRIEF DESCRIPTION OF THE DRAWINGS

Referring now to the drawings in which like reference numbers represent corresponding parts throughout:

FIGS. 3 and 4 illustrate various structures in accordance with certain implementations of the invention.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
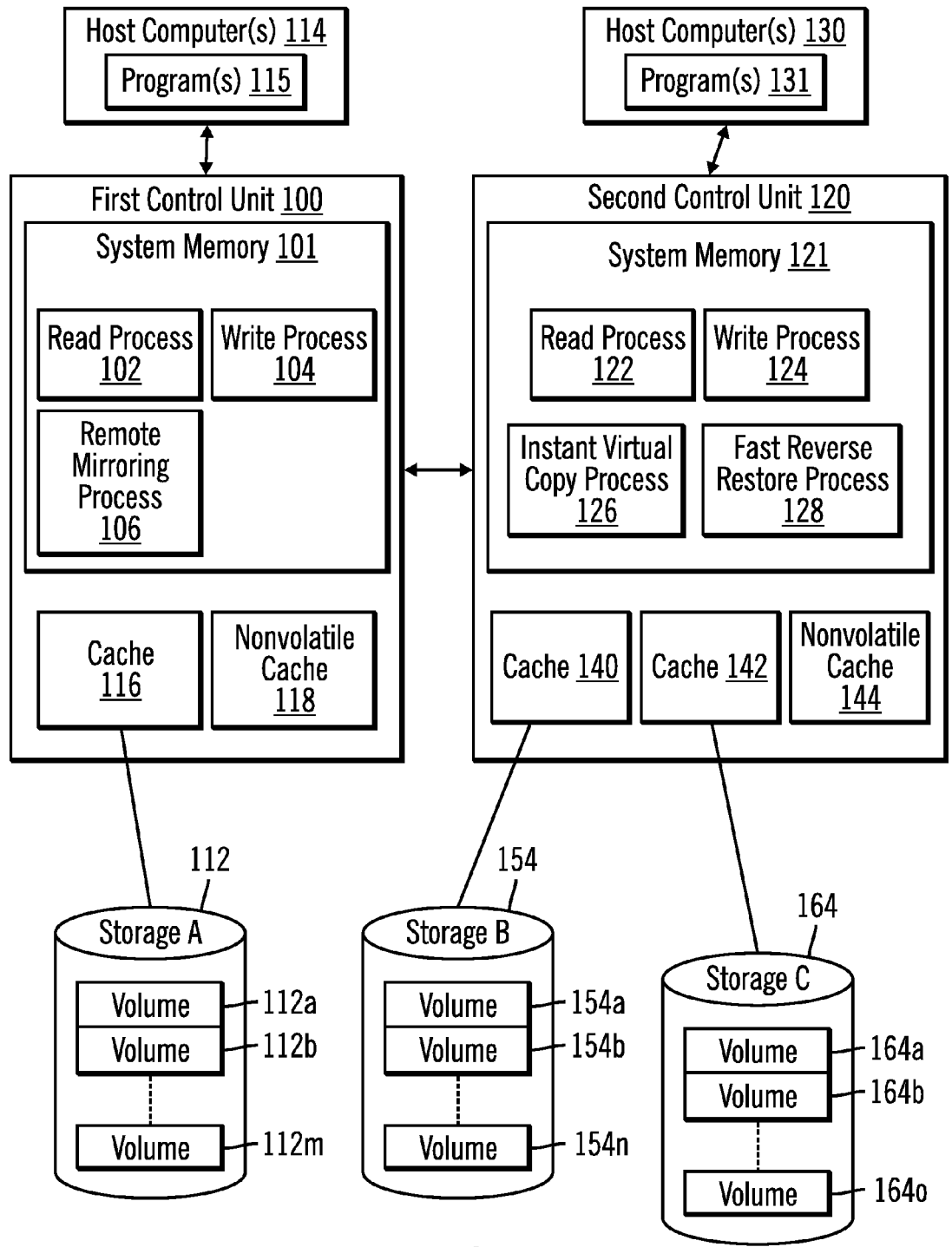
FIG. 1 illustrates, in a block diagram, a computing environment in accordance with certain implementations of the invention.

FIG. 1 illustrates, in a block diagram, a computing environment in accordance with certain implementations of the invention. A first control unit 100 provides one or more host computers 114 access to storage A 112. The host computers 114 may each execute one or more programs 115 under control of an operating system (not shown) and executing on a Central Processing Unit (CPU) (not shown). The first control unit 100 receives Input/Output (I/O) requests from one or more programs 115 at one or more host computers 114 (e.g., over a network) directed toward storage A 112 configured to have volumes (e.g., Logical Unit Numbers, Logical Devices, etc.) 112a,b, . . . m, where m represents that there may be any number of volumes.

Figure 2:
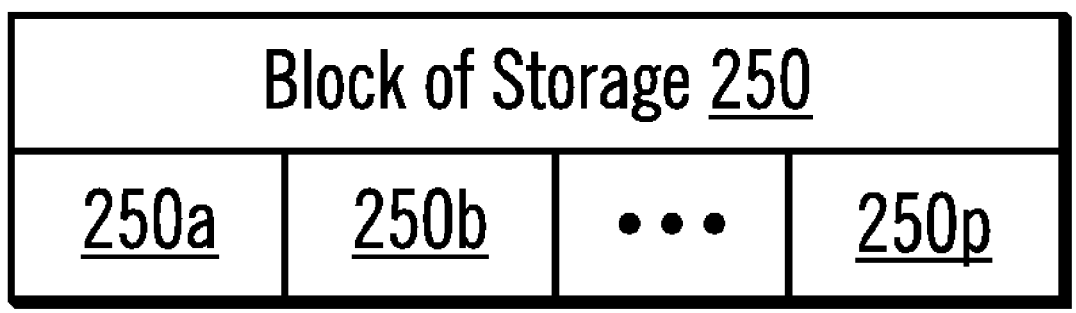
FIG. 2 illustrates blocks of storage in accordance with certain implementations of the invention.

FIG. 2 illustrates blocks of storage in accordance with certain implementations of the invention. The storage A 112 may be divided into blocks of storage 250 (FIG. 2) containing blocks of data, and the blocks of storage 250 are further divided into sub-blocks of storage (250a-250p, where p represents that there may be any number of sub-blocks) that contain sub-blocks of data. In certain implementations, the blocks of data are contents of tracks, while the sub-blocks of data are contents of sectors of tracks.

The first control unit 100 includes a cache 116 in which updates to blocks of data in the storage A 112 are maintained until written to storage A 112 (i.e., the blocks of data are destaged). The system memory 101 may be in a separate memory devices from cache 116 or may share a memory device with cache 116.

Additionally, the first control unit 100 includes a nonvolatile cache 118. The non-volatile cache 118 may be, for example, a battery-backed up volatile memory, to maintain a non-volatile copy of data updates and other information.

The first control unit 100 includes system memory 101 in which a read process 102 for reading data, and a write process 104 for writing data reside. The system memory 101 also includes a remote mirroring process 106 for transferring data from the first control unit 100 to remote storage, such as storage at the second control unit 120. That is, the remote mirroring process 106 performs a remote mirroring copy operation, such as a PPRC copy operation. When a remote mirroring copy operation is being performed between two storages, the two storages may be said to be in a "remote mirroring relationship." When an instant virtual copy operation is being performed between two storages, the two storages may be said to be in an "instant virtual copy relationship", which is a type of point-in-time copy relationship.

Second control unit 120 includes system memory 121 in which a read process 122 for reading data, and a write process 124 for writing data reside. The system memory 101 also includes an instant virtual copy process 126 and a fast reverse restore process 128. The fast reverse restore process 128 reverses a point-in-time copy (i.e., restores original data that had been copied from an original source to an original target with an instant virtual copy operation). The fast reverse restore command is received after an instant virtual copy has been performed, and the fast reverse restore command may be performed before a background copy has been completed by the instant virtual copy.

The fast reverse restore process 128 performs a reverse restore operation that transfers data from an original target to an original source to restore data at the original source to what the data was at the time of a last instant virtual copy from the original source to the original target. In certain implementations of the invention, there may be multiple reverse restore processes. In certain implementations of the invention, the reverse restore process may be executed at another storage controller connected to storage controller 120 instead of, or in addition to, execution at the storage controller 120.

Second control unit 120 provides one or more host computers 130 access to storage, such as storage B 154, which maintains back-up copies of all or a subset of the volumes of the storage A 112, and storage C 164. The host computers 130 may each execute one or more programs 131 under control of an operating system (not shown) and executing on a Central Processing Unit (CPU) (not shown). The host computers 130 may be the same as host computers 114, may be different from host computers 114 or may form a subset of the host computers 114.

The second control unit 120 also includes a cache 140 in which updates to blocks of data in the storage B 154 may be maintained until written to storage B 154 (i.e., the blocks of data are destaged), and a cache 142 in which updates to blocks of data in storage C 164 may be maintained until written to storage C 164. The cache 140 and cache 142 may comprise separate memory devices or different sections of a same memory device. The cache 140 and cache 142 may be used to buffer read and write data being transmitted between the hosts 114, 130, storage B 154, and storage C 164. Further, caches 140 and 142 may be referred to as source and target caches for holding source or target blocks of data in a point-in-time copy relationship (e.g., an instant virtual copy relationship), and the caches 140 and 142 may store at the same time source and target blocks of data in different point-in-copy relationships.

The system memory 121 may be in a separate memory device from caches 140 and 142 or may share a memory device with one or both caches 140 and 142.

Additionally, the second control unit 120 includes a non-volatile cache 144. The non-volatile cache 144 may be, for example, a battery-backed up volatile memory, to maintain a non-volatile copy of data updates and other information.

Storage B 154 maintains copies of all or a subset of the volumes 112*a,b* . . . *m* of the storage A 112. Additionally, storage B 154 may be updated by, for example, one or more programs 115, 131 at one or more host computers 114, 130, respectively. Storage B 154 is configured to have volumes (e.g., Logical Unit Numbers, Logical Devices, etc.) 154*a,b* . . . *n*, where n represents that there may be any number of volumes. The volumes 154*a,b*, . . . *n* may be divided into blocks of storage 250 (FIG. 2) containing blocks of data, and the blocks of storage 250 are further divided into sub-blocks of storage (250*a*-250*p*, where p may be any integer value) that contain sub-blocks of data. A volume may be any logical or physical element of storage. In certain implementations, the blocks of data are contents of tracks, while the sub-blocks of data are contents of sectors of tracks.

Storage C 164 may maintain copies of all or a subset of the volumes 154*a,b* . . . *n* of the storage B 154. Additionally, storage C 164 may be updated by, for example, one or more programs 115, 131 at host computers 114, 130, respectively. Storage C 164 is configured to have volumes (e.g., Logical Unit Numbers, Logical Devices, etc.) 164*a,b* . . . *o*, where o represents that there may be any number of volumes. The volumes 164*a,b*, . . . *o* may be divided into blocks of storage 250 (FIG. 2) containing blocks of data, and the blocks of storage 250 are further divided into sub-blocks of storage (250*a*-250*p*, where p may be any integer value) that contain sub-blocks of data. A volume may be any logical or physical element of storage. In certain implementations, the blocks of data are contents of tracks, while the sub-blocks of data are contents of sectors of tracks.

In certain implementations, removable storage (instead of or in addition to remote storage, such as storage B 154) may be used to maintain back-up copies of all or a subset of the storage A 112, and the techniques of the invention transfer data to the removable storage rather than to the remote storage. The removable storage may reside at the first control unit 100.

In certain implementations, the first control unit 100 and second control unit 120 may be comprised of the IBM 3990, Model 6 Storage Controller, Enterprise Storage Server®, or any other control unit known in the art.

In certain implementations, the host computers 114, host computers 130, first control unit 100 and/or second control unit 120 may comprise any computing device known in the art, such as a mainframe, server, personal computer, workstation, laptop, handheld computer, telephony device, network appliance, virtualization device, storage controller, etc.

A primary site may include multiple first control units, storage, and host computers. A secondary site may include multiple second control units, recovery systems, and storage.

In certain implementations of the invention, data is maintained in volume pairs. A volume pair is comprised of a first volume in a first storage device (e.g., storage A 112) and a corresponding volume in a second storage device (e.g., storage B 154) that includes a consistent copy of the data maintained in the first volume. For example, volume 112*a* at storage A 112 may correspond to volume 154*a* at storage B 154.

In certain implementations, the first control unit 100 and second control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

For storage 112, 154, and 164, the values of m, n, and o may be the same or different. The storage 112, 154, and 164 may each comprise an array of storage devices, such as Direct Access Storage Devices (DASDs), Just a Bunch of Disks (JBOD), Redundant Array of Independent Disks (RAID), virtualization device, etc.

For ease of reference, the terms tracks and sectors may be used herein as examples of blocks of data and sub-blocks of data, but use of these terms is not meant to limit the technique of the invention to tracks and sectors. The techniques of the invention are applicable to any type of storage, block of storage or block of data divided in any manner.

Implementations of the invention are applicable to the transfer of data between any two storage mediums, which for ease of reference may be referred to herein as source storage and target storage or as first storage and second storage. For example, certain implementations of the invention may be used with two storage mediums located at a single storage controller 120, as illustrated in FIG. 1. Moreover, certain alternative implementations of the invention may be used with two storage mediums located at different storage controllers, different physical sites, etc. Also, for ease of reference, a block of data in source storage may be referred to as a "source block of data," and a block of data in target storage may be referred to as a "target block of data."

When the indication of which storage is to be a source and which storage is to be a target is reversed, for ease of reference, the "original source" may be referred to as a "new target", the "original target" may be referred to as a "new source", an "original source block of data" may be referred to as a "new target block of data," and an "original target block of data" may be referred to as a "new source block of data."

FIG. 3 illustrates structures 310 in accordance with certain implementations of the invention. The cache 116 or nonvolatile cache 118 may include one or more out of sync structures 310. An out of sync structure 310 is used to determine which blocks of storage (e.g., tracks) have been updated since a last transfer from one storage to another storage, without regard to the particular updated sub-blocks (e.g., sectors) of the block of storages. When an indicator is set to a first value (e.g., one), the setting indicates that the block of data has been updated since the last transfer (e.g., due to a PPRC copy operation). When an indicator is set to a second value (e.g., zero), the setting indicates that the block of data has not been updated since the last transfer (e.g., due to a PPRC copy operation). For example, out of sync structure 310 would be maintained for storage a 112 if storage A 112 were in a remote mirroring relationship with storage B 154.

FIG. 4 illustrates various structures 410, 420, and 430 in accordance with certain implementations of the invention. A storage B structure 410 is used to monitor updates to blocks of data within portions of data in the storage B 154 for which an instant virtual copy relationship has been established between a portion of source storage and a portion of target storage. In certain implementations, there is a storage B structure 410 for each volume on storage B 154. The storage B structure 410 includes an indicator (e.g., a bit) for each block of data in the source storage that is part of the instant virtual copy relationship. When an indicator is set to a first value (e.g., one), the setting indicates that the block of data has not been copied from the portion of the source storage to the target storage. When an indicator is set to a second value (e.g., zero), the setting indicates that the block of data has been copied from the portion of the source storage to the portion of the target storage.

A storage C structure 420 is used to monitor updates to blocks of data within portions of data in target C 164 after an instant virtual copy relationship has been established between a portion of source storage and a portion of target storage. In certain implementations, there is a storage C structure 420 for each volume on storage C 164. The storage C structure 420 includes an indicator (e.g., a bit) for each block of data in the source storage that is part of the instant virtual copy relationship. When an indicator is set to a first value (e.g., one), the setting indicates that the block of data has not been copied from the portion of the source storage to the target storage. When an indicator is set to a second value (e.g., zero), the setting indicates that the block of data has been copied from the portion of the source storage to the portion of the target storage.

Structures 410, 420 may each be viewed as either a source structure or a target structure, depending on whether each associated storage 154, 164 is being treated as a source or a target of a copy operation.

An out of sync structure 430 is used to determine which blocks of storage (e.g., tracks) have been updated since a last transfer to from one storage to another storage, without regard to the particular updated sub-blocks (e.g., sectors) of the block of storages. When an indicator is set to a first value (e.g., one), the setting indicates that the block of data has been updated since the last transfer (e.g., due to a PPRC copy operation). When an indicator is set to a second value (e.g., zero), the setting indicates that the block of data has not been updated since the last transfer (e.g., due to a PPRC copy operation). For example, out of sync structure 430 would be maintained for storage B 154 if storage B 154 were in a remote mirroring relationship with storage A 112.

In certain implementations of the invention, each structure 300, 310, 400, 410, and 420 comprises a bitmap, and each indicator comprises a bit. In each structure 300, 310, 400, 410, and 420, the nth indicator corresponds to the nth block of data (e.g., the first indicator in each structure 400, 410, and 420 corresponds to the first data block). Although the structures 300, 310 and structures 400, 410, and 420 have been illustrated as three separate structures, the structures 300, 310 may be combined in any form without departing from the scope of the invention, and the structures 400, 410, and 420 may be combined in any form without departing from the scope of the invention. In certain implementations of the invention, there is a copy of each structure for each volume. In certain alternative implementations of the invention, there is a single copy of each structure for all volumes.

Figure 5A:
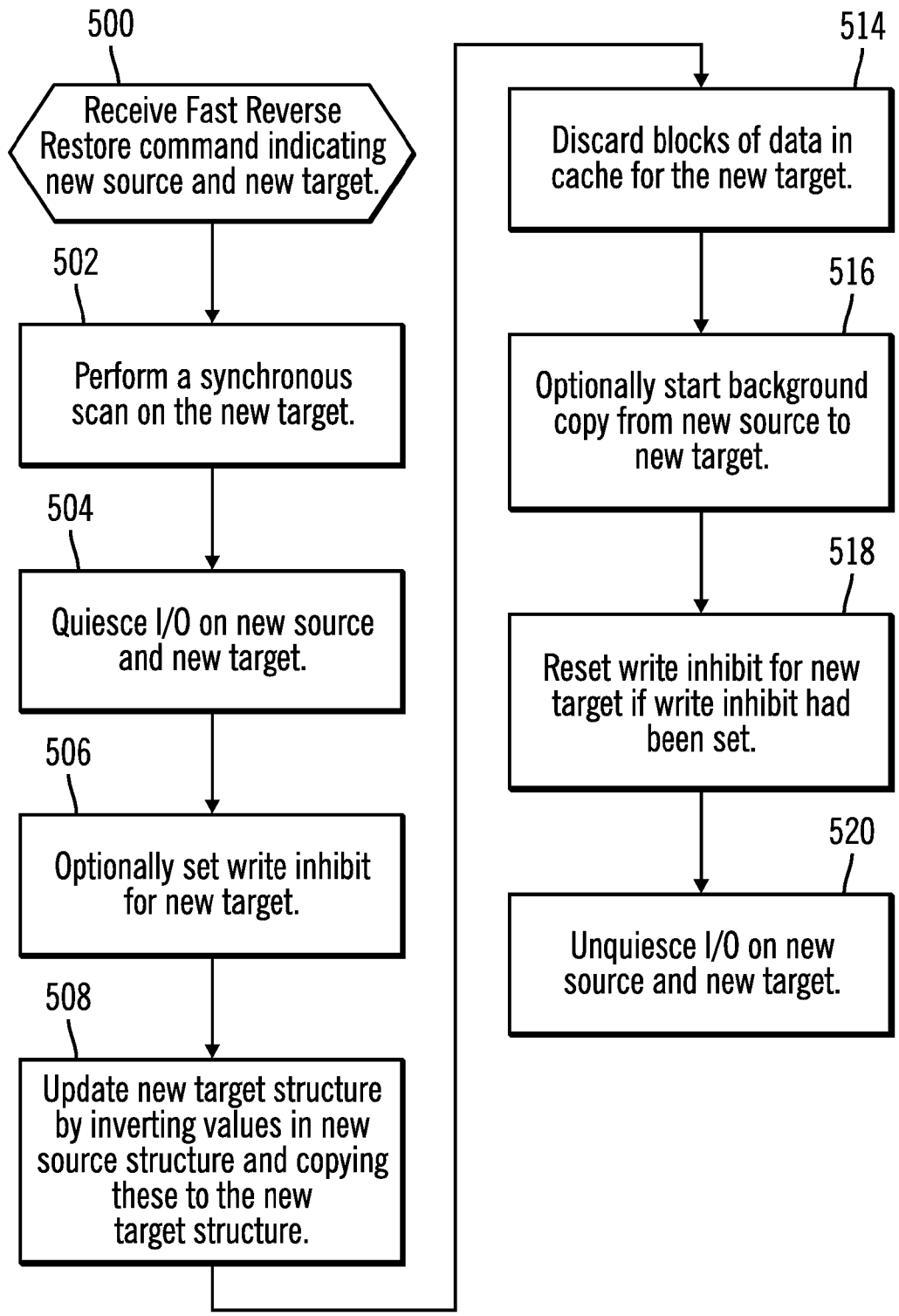
FIG. 5A illustrates logic implemented in a reverse restore process in accordance with certain implementations of the invention.

FIG. 5A illustrates logic implemented in the reverse restore process 310 in accordance with certain implementations of the invention. For ease of illustration, a volume 154a of storage B 154 may be treated as an original source, and a volume 164a of storage C 164 may be treated as an original target. A fast reverse restore command then specifies that the volume 164a of storage C 164 is to be treated as a new source and that a volume 154a of storage B 154 is to be treated as a new target.

In certain implementations of the invention, prior to execution of the fast reverse restore process 128, updates that have been made to an original source (e.g., volume 154a) since an instant virtual copy operation was performed to an original target (e.g., volume 164a) may be either in cache 140, nonvolatile cache 144, and/or on storage B 154. If these updates have been destaged to the storage B 154, then, prior to that destage a copy of the original data would have been made from volume 154a to volume 164a.

Additionally, there may be some blocks of data in cache 140 and/or nonvolatile cache 144 for volume 154a that existed at the time the instant virtual copy relationship was created. These blocks of data are part of the original instant virtual copy relationship.

Moreover, for each block of data that is copied from volume 154a to volume 164a, an indicator in the storage C structure 420 (associated with volume 164a) is reset to indicate that the block of data has been copied from volume 154a to volume 164a.

Volume 164a is write inhibited to protect the point-in-time copy. That is, programs 115, 131 at host computers 114, 130 are not allowed to write to the protected point-in-time copy created by the instant virtual copy operation.

In FIG. 5A, control begins at block 500 with receipt of a fast reverse restore command that indicates a new source (e.g., volume 164a) and a new target (e.g., volume 154a). In block 502, the fast reverse restore process 128 performs a synchronous scan on the new target (volume 154a). In particular, with the synchronous scan, blocks of data in cache 140 at the new target (volume 154a) that existed at the time an instant virtual copy relationship was created from the original source (i.e., the new target) to the original target (i.e., the new source) (e.g., from volume 154a to volume 164a) are moved to physical storage. In particular, blocks of data that belong to the instant virtual copy relationship are destaged to physical storage for the new target (volume 154a) but are not copied to the new source (volume 164a). Also, for blocks of data that were updated after the instant virtual copy operation, the original content of the blocks of data on the physical storage for the new target (volume 154) are copied to physical storage for the new source (volume 164a), and the corresponding indicators for the copied blocks of data are reset in structure 420, which may be referred to as a new source structure as it is associated with the new source (volume 164a), to indicate that the blocks of data have been copied. In block 504, the fast reverse restore process 128 quiesces the I/O on the new source (volume 164a) and on the new target (volume 154a). In certain implementations, I/O is quiesced before performing the synchronous scan of block 502 and no additional blocks of data are updated for the new target. In block 506, the fast reverse restore process 128 optionally sets the new target (volume 154a) as write inhibited.

In block 508, the fast reverse restore process 128 updates structure 410 by inverting the values in the new source structure 420 and copying these values to structure 410, which may be referred to as the new target structure as it is associated with the new target (volume 154a). In certain implementations, the processing of block 508 is performed once the scan of block 506 is completed. In certain implementations in which the indicators in the new source structure are ones and zeroes, inverting values refers to converting zeros to ones and ones to zeroes). The new target structure 410 then represents the blocks of data that are to be physically copied from the new source (volume 164a) back to the new target (volume 154a). From block 508, processing continues to block 514.

In block 514, the fast reverse restore process 128 discards the blocks of data in cache 140 for the new target (volume 154a) as these were previously processed (e.g., copied as needed to the new source (volume 164a)). In block 516, the fast reverse restore process 128 optionally starts a background copy (i.e., a type of physical copy) from the new source (volume 164a) to the new target (volume 154a). The background copy operation copies blocks of data from volume 164a to volume 154a for which indicators are set in a storage B structure 410. In certain implementations, rather than performing a physical background copy, a logical copy is performed. In block 518, the fast reverse restore process 128 resets the write inhibit for the new target (volume 154a) if write inhibit had been set in block 506. In block 520, the fast reverse restore process 128 unquiesces I/O on the new source (volume 164a) and new target (154a).

Additionally, the fast reverse restore process 128 may optionally perform a copy from the new target (volume 154a) to one or more storages (e.g., to volume 164a or to another storage). When copying is performed from the new target (volume 164a), the new target may be referred to as a "source". In particular, once the background copy is complete (which should be very quick, especially for an asynchronous PPRC copy operation where an instant virtual copy operation was performed a short time before the fast reverse restore command was issued), the new target (volume 154a) is a physically restored copy, and the instant virtual copy relationship between the new source (164a) and new target (154a) is terminated. The updated volume 154a may then be copied with a new instant virtual copy operation to volume 164a again, which may be performed so that a consistent copy of data on volume 154a resides on volume 164a. In certain implementations, the updated volume 154a may be copied to up to eleven additional volumes to create one or more logical copies.

Figure 5B:
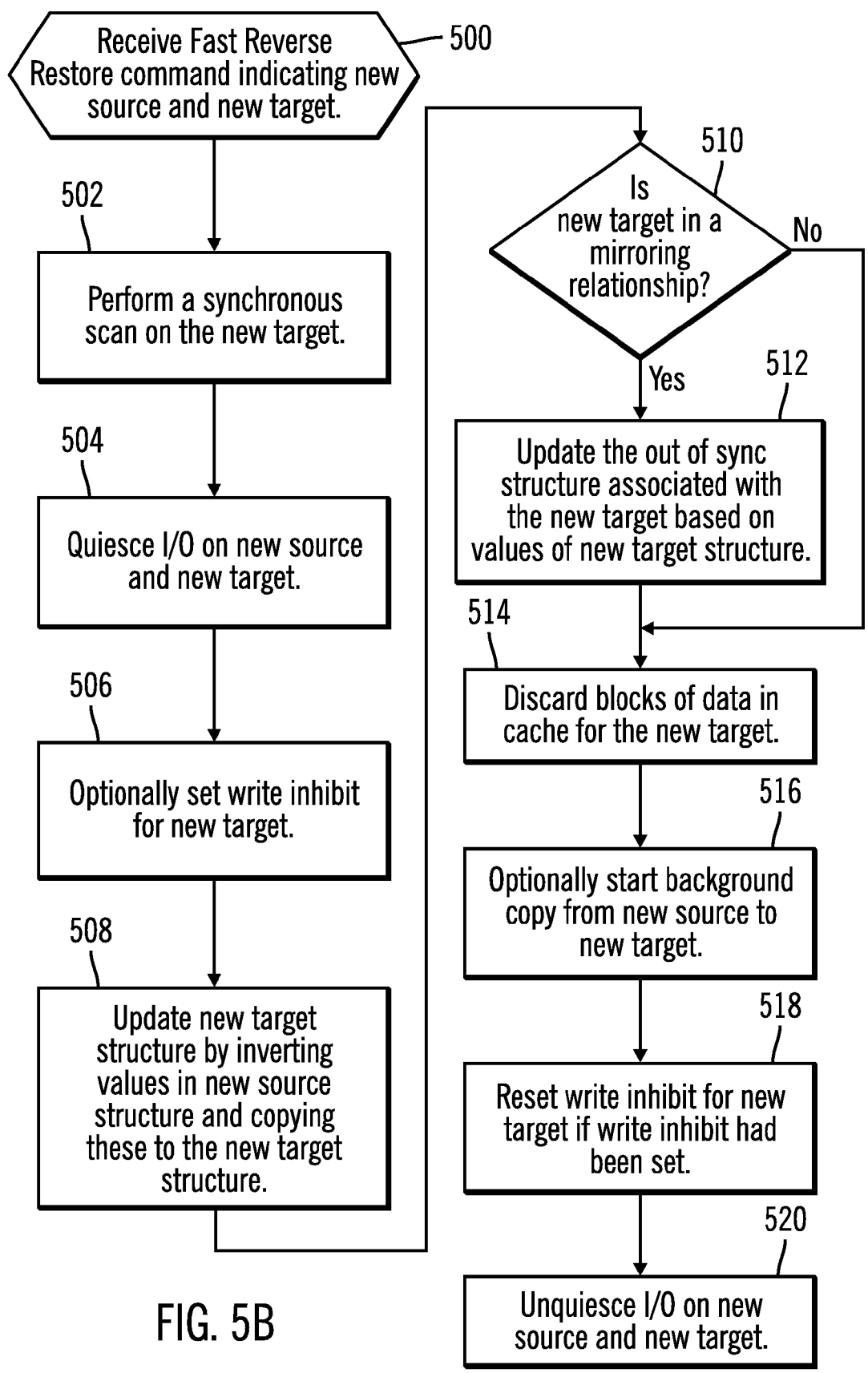
FIG. 5B illustrates logic implemented in the reverse restore process in accordance with certain alternative implementations of the invention.

FIG. 5B illustrates logic implemented in the reverse restore process 310 in accordance with certain alternative implementations of the invention. FIG. 5B includes the processing of FIG. 5A, but block 508 continues to block 510, rather than to block 514. Also, in FIG. 5B, block 510 or 512 continues to block 514 (depending on the outcome of processing in block 510). In block 510, the fast reverse restore process 128 determines whether the new target is in a remote mirroring relationship. For example, the fast reverse restore process 128 determines whether the new target (volume 154a) is also a primary mirroring volume in a remote mirroring relationship (e.g., which it is for an asynchronous PPRC copy operation or after a remote mirroring failover command has been issued). A primary mirroring volume may be described as a volume that is the source of a remote mirroring copy operation, and a secondary mirroring volume may be described as a volume that is a target of the remote mirroring copy operation. A remote mirroring failover command indicates that processing should fail over from one storage (e.g., storage A 112) to another storage (e.g., storage B 154). If the new target is in a remote mirroring relationship, processing continues to block 512, otherwise, processing continues to block 514. In block 512, the out of sync structure 430 associated with the new target (volume 154a) is updated based on values in the new target structure 410. In certain implementations, the updating performs an OR operation between the new target structure 410 and the out of sync structure 430. The resulting updated new out of sync structure 430 then includes blocks of data identified in the target structure 410 that are to be copied from the new target (volume 154a) to the storage in the remote mirroring relationship (e.g., volume 112b).

To further illustrate implementations of the invention, FIGS. 6-9 will be used to describe examples of implementations of the invention. Implementations of the invention are applicable to scenarios in which an instant virtual copy has been made from a source to a target and the data is to be restored at the source. Such scenarios include those in which no PPRC copy operation is performed. For example, if an instant virtual copy is performed from source A to target B, and then, due to some error (e.g., software corruption, etc.) source A was corrupted, the fast reverse restore command is used to restore the contents of source A to what they were at the time of the instant virtual copy.

Figure 6:
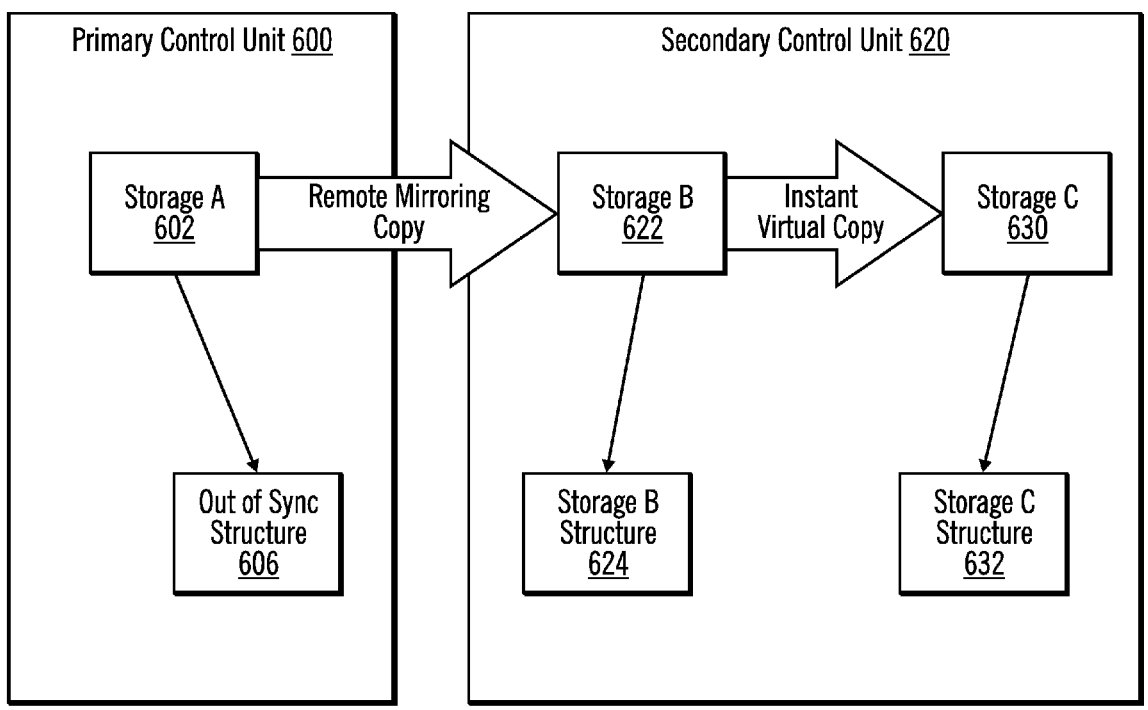
FIG. 6 illustrates, in a block diagram, an initial computing environment in accordance with certain implementations of the invention.

FIG. 6 illustrates, in a block diagram, an initial computing environment in accordance with certain implementations of the invention. A primary control unit 600 is connected to a secondary control unit 620. The primary control unit 600 includes storage A 602, for which an out of sync structure 606 is maintained. The secondary control unit 620 includes storage B 622, for which a storage B structure 624 is maintained. The secondary control unit 620 also includes storage C 630 for which a storage C structure 632 is maintained. A remote mirroring copy operation (e.g., a PPRC copy operation) is being performed from storage A 602 to storage B 622. Also, an instant virtual copy operation (e.g., a FlashCopy® operation) is being performed from storage B 622 to storage C 630.

In certain implementations, the computing environment of FIG. 6 is an asynchronous PPRC environment in which a PPRC Extended Distance copy operation is being performed. Host I/O is being written to one or more volume(s) on storage A 602. Also, there exists an asynchronous PPRC relationship (i.e., a type of remote mirroring copy relationship) between storage A 602 and storage B 622. There exists a full volume FlashCopy® relationship (i.e., a type of instant virtual copy relationship) between storage B 622 and storage C 630, with target write inhibit (i.e., a write inhibit of storage C 630). Initially, storage B 622 is a source for the FlashCopy® relationship, and storage C 630 is a target volume for the Flash-Copy® relationship.

In certain scenarios, the primary control unit 600 may fail, while an asynchronous PPRC copy operation (i.e., a type of remote mirroring copy operation) is being performed between storage A 602 and storage B 622 and while a Flash-Copy® operation (i.e., a type of instant virtual copy operation) is being performed between storage B 622 and storage C 630. In such scenarios, once a primary control unit 600 failure has occurred, the asynchronous PPRC copy operation is no longer able to form consistency groups that include updates from the primary control unit 600.

Figure 7:
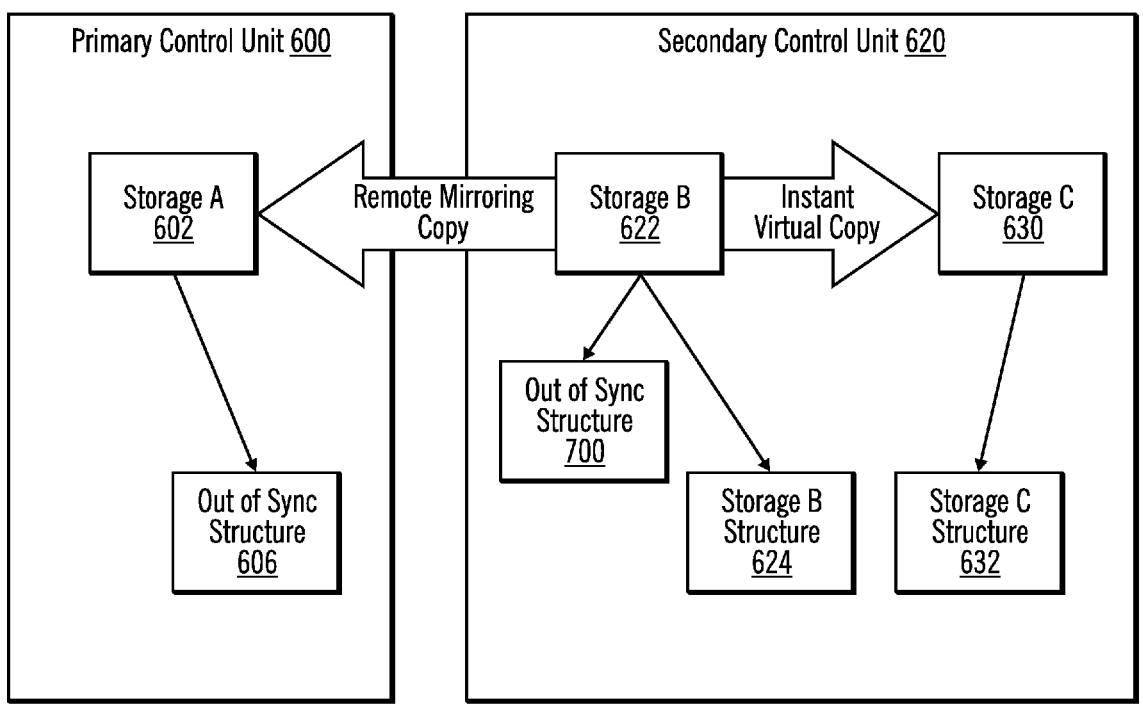
FIG. 7 illustrates, in a block diagram, failover processing in accordance with certain implementations of the invention.

FIG. 7 illustrates, in a block diagram, failover processing in accordance with certain implementations of the invention. A recovery program issues a failover command to the volumes on B storage 622 to force the termination of the remote mirroring relationship from storage A 602 to storage B 622 and to establish a remote mirroring relationship from storage B 622 to storage A 602 (e.g., see the direction of the remote mirroring relationship in FIG. 7). With the new remote copy relationship, an out of sync structure 700 is maintained for volumes on storage B 622. In certain implementations, the volumes on storage B 622 are expected to receive and successfully process the failover command before further recovery processing occurs.

Figure 8:
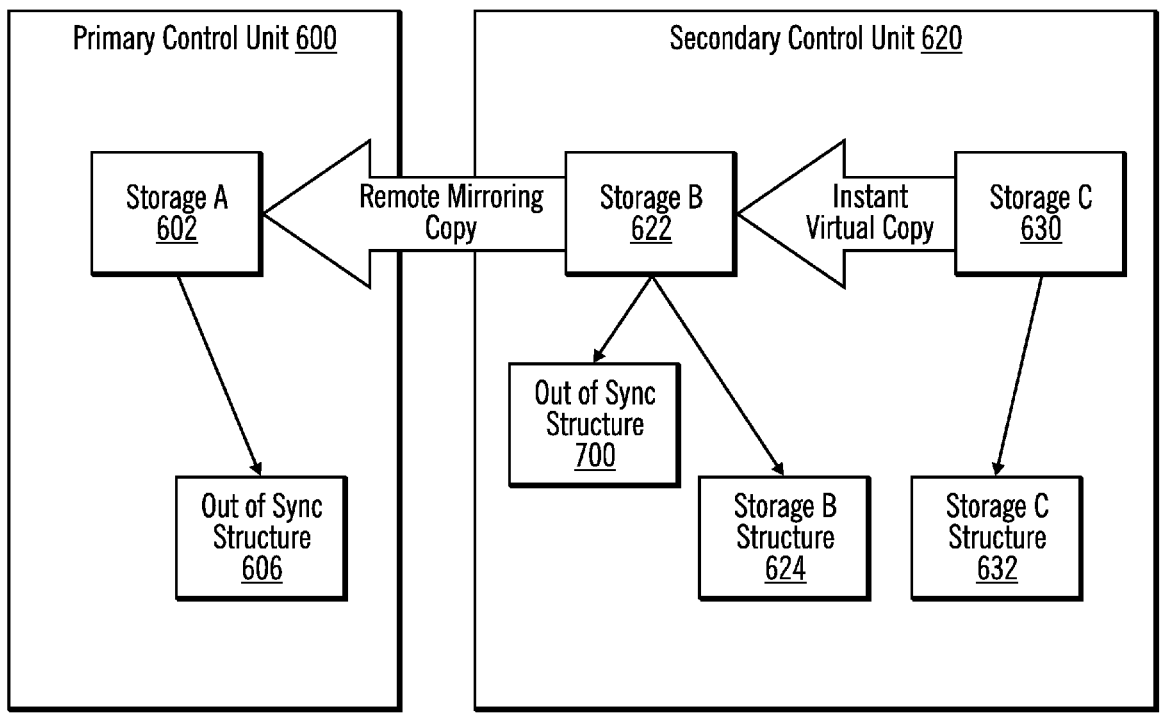
FIG. 8 illustrates, in a block diagram, fast reverse restore processing in accordance with certain implementations of the invention.

FIG. 8 illustrates, in a block diagram, fast reverse restore processing in accordance with certain implementations of the invention. At the time of the failover of the primary control unit 600, storage C 630 has a consistent copy of data, and storage B 622 may have certain additional updates for the data since the consistent copy was created on storage C 630. Because storage C 630 has the consistent copy of data, the data is copied via a fast reverse restore command from storage C 630 to storage B 622. Then, a remote mirroring copy operation may transfer the consistent copy of data from storage B 622 to storage A 602. This operation may occur at a later time (e.g., in response to a failback command that indicates that processing should fail over from one storage back to another storage). In alternative implementations, the data may be copied from storage B 622 to storage A 602 in another manner.

In certain implementations, a recovery program issues a fast reverse restore command to the storage B 622 to storage C 630 instant virtual copy relationship indicating that a background copy is to be started, that the target volume may be a primary mirroring volume for a PPRC copy operation, and that the instant virtual copy relationship is not persistent (i.e., the instant virtual copy relationship is terminated when the instant virtual copy operation is completed).

The fast reverse restore command does not require that all blocks of data involved in an instant virtual copy relationship be physically copied from the source (storage B 622) to the target (storage C 630) prior to performing the fast reverse restore. Thus, the storage C structure 632 may have some indicators set to indicate that blocks of data are still to be copied from storage B 622 when the fast reverse restore command is issued. The fast reverse restore command ensures that for volumes on storage B 622 that have been modified since the last instant virtual copy operation, physical copies of the original data are transferred from storage B 622 to storage C 630 before data is copied from storage C 630 back to storage B 622. Also, the fast reverse restore command ensures that the source (storage B 622) is physically restored to the data as it existed at the time of the last instant virtual copy (e.g., from storage B 622 to storage C 630).

After the execution of the fast reverse restore command, a volume on storage C 630 may not be usable. For example, because the instant virtual copy operation is a logical operation, not all blocks of data involved in the copy operation may have been physically copied to storage C 630 from storage B 622. In such cases, another instant virtual copy operation may be issued to copy blocks of data from storage B 622 to storage C 630.

Moreover, the fast reverse restore command detects whether a new target volume is a primary mirroring volume for a PPRC copy relationship. If the new target volume is a primary mirroring volume for a PPRC copy relationship, the fast reverse restore command updates the out of sync structure 700 of storage B 622 with the storage B structure 624.

The fast reverse restore command is performed by starting a synchronous scan on volumes on storage B to ensure that original data for a point in time copy (e.g., an instant virtual copy) is moved to storage C 630. The synchronous scan destages all data in the cache for storage B 622. If the data in cache belongs to the point in time relationship, then no data is copied from storage B 622 to storage C 630. If the data was updated after the point in time copy, then this destage will force a copy of the original data from storage B 622 to storage C 630. Also, an inverted storage C structure 632 is copied to the storage B structure 624. Additionally, the blocks of data in cache for the volumes in storage B 622 are discarded. Then, a background copy is started and the target write inhibit for storage C is reset. Also, there is no I/O to the volumes on storage B 622 and storage C 622 during this time.

The recovery program waits until the background copies complete on the volumes on storage B 622. Then, the recovery program issues queries to check whether the background copies have completed on the volumes on storage B 622. When this has occurred, the consistency group has been "hardened" on the volumes on storage B 622. The storage C 630 to storage B 622 instant virtual copy relationship terminates when the background copies complete.

Figure 9:
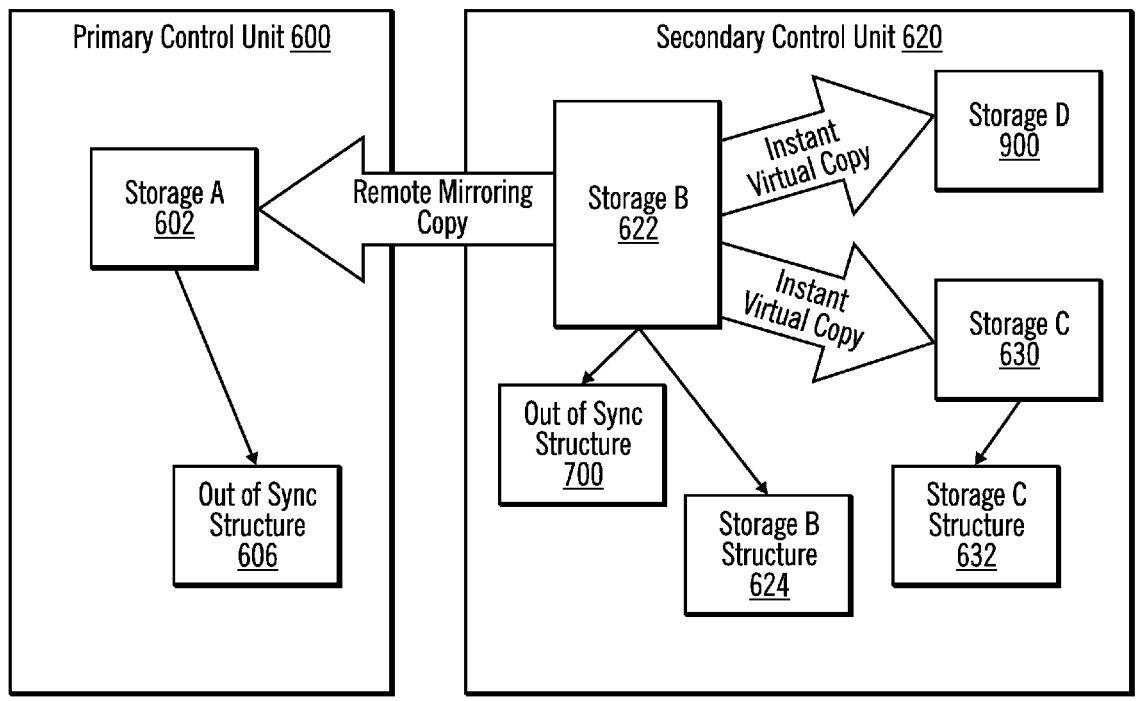
FIG. 9 illustrates, in a block diagram, additional processing in accordance with certain implementations of the invention.

FIG. 9 illustrates, in a block diagram, additional processing in accordance with certain implementations of the invention. The recovery program may issue a new instant virtual copy operation (e.g., a FlashCopy® operation) optionally specifying that change recording is to start and/or that the target of the FlashCopy® operation is write inhibited. This new instant virtual copy operation creates a consistency group backup copy on storage C 630 from data on storage B 622. Additionally, a consistency group test copy may be generated on, for example, test storage D 900 (FIG. 9), by issuing an instant virtual copy operation from storage B 622 to test storage D 900.

The host computers are activated on the secondary control unit 620 (e.g., the host computers may be activated by the recovery program). The recovery consistency group is saved on the volumes on storage C 630. Changes made by activities by host computers on the secondary control unit 620 are recorded on volumes at storage B 622 and out of sync structure 700 associated with storage B 622.

FlashCopy, IBM, Enterprise Storage Server, and ESCON are registered trademarks or common law marks of International Business Machines Corporation in the United States and/or other countries.

Additional Implementation Details

The described embodiments may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The illustrated logic of FIGS. 5A and 5B describes specific operations occurring in a particular order. In alternative implementations, certain of the logic operations may be performed in a different order, updated or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 5A and 5B may be implemented in software, hardware, programmable and non-programmable gate array logic or in some combination of hardware, software, or gate array logic.

Figure 10:
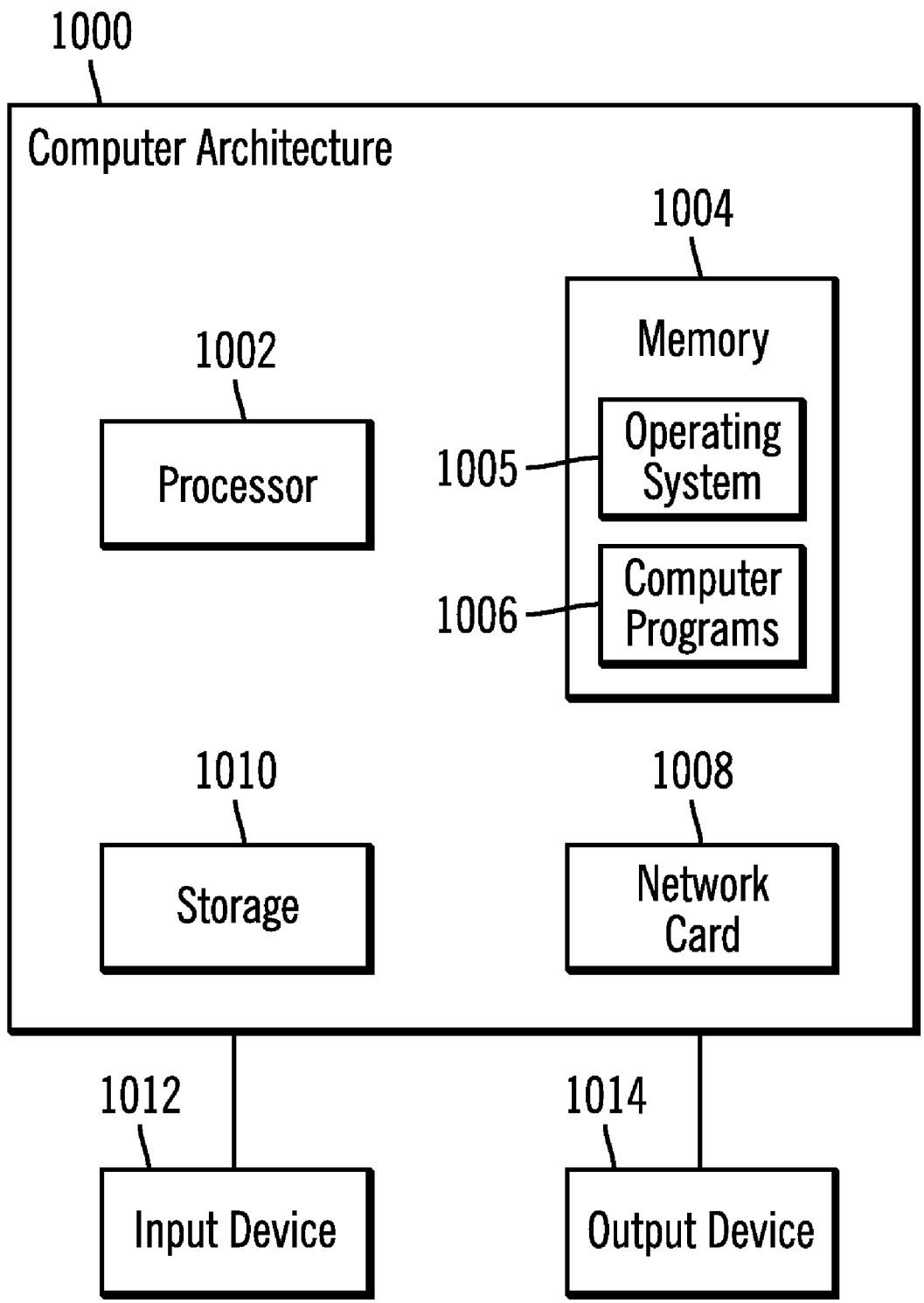
FIG. 10 illustrates an architecture of a computer system that may be used in accordance with certain implementations of the invention.

FIG. 10 illustrates an architecture of a computer system that may be used in accordance with certain implementations of the invention. Host computers 114, host computers 130, first control unit 100, and/or secondary control unit 120 may implement computer architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A data storage system for performing a copy operation, comprising:

a control unit including a cache and coupled to an original source and an original target;

an instant virtual copy process adapted to:
perform an instant virtual copy operation from the original source to the original target, wherein the instant virtual copy operation performs a first background copy that copies blocks of data from the original source to the original target; and a fast reverse restore process adapted to:
before the first background copy has completed,
receive a fast reverse restore command indicating a new source and a new target, wherein the new source is the original target and the new target is the original source, wherein the fast reverse restore command restores original data that had been copied from the original source to the original target with the instant virtual copy operation before the first background copy has been completed by the instant virtual copy operation;
perform a synchronous scan on the new target;
update a new target structure associated with the new target using a new source structure associated with the new source, wherein updating the new target structure further comprises inverting indicators in the new source structure and copying the inverted indicators to the new target structure; and
perform a second background copy from the new source to the new target using the updated new target structure.

2. The data storage system of claim 1, wherein the synchronous scan is performed so that blocks of data in the cache for the new target and that existed at the time an instant virtual copy relationship was created from the original source to the original target are moved to physical storage.

3. The data storage system of claim 2, wherein, when performing the synchronous scan, the fast reverse restore process is adapted to:
for blocks of data that belong to the instant virtual copy relationship, destage the blocks of data to the physical storage for the new target; and
for blocks of data that were updated after the instant virtual copy operation,
copy the original content of the updated blocks of data on the physical storage for the new target to physical storage for the new source; and
set a corresponding indicator for each copied block of data in the new source structure to indicate that the block of data has been copied.

4. The data storage system of claim 3, wherein the fast reverse restore process is adapted to:
discard blocks of data in the cache for the new target.

5. The data storage system of claim 1, wherein the fast reverse restore process is adapted to:
determine whether the new target is in a remote mirroring relationship; and
when the new target is in a remote mirroring relationship, update an out of sync structure associated with the new target based on values in the new target structure.

6. The data storage system of claim 1, wherein the fast reverse restore process is adapted to:
set write inhibit for the new target in response to receiving the fast reverse restore command; and
reset the write inhibit for the new target in response to performing the fast reverse restore command.

7. The data storage system of claim 1, wherein the fast reverse restore process is adapted to:
quiesce Input/Output (I/O) operations on the new source and the new target in response to receiving the fast reverse restore command; and
unquiesce I/O operations on the new source and the new target in response to performing the fast reverse restore command.

8. The data storage system of claim 1, wherein the instant virtual copy process is adapted to:
perform an instant virtual copy operation from the new target to the new source.

9. The data storage system of claim 1, wherein the instant virtual copy process is adapted to:
perform an instant virtual copy operation from the new target to a test storage.

10. A data storage system for performing a copy operation, comprising:
a control unit including a cache and coupled to an original source and an original target;
an instant virtual copy process adapted to:
perform an instant virtual copy operation from the original source to the original target, wherein the instant virtual copy operation performs a first background copy that copies blocks of data from the original source to the original target; and
a fast reverse restore process adapted to:
before the background copy has completed,
receive a fast reverse restore command indicating a new source and a new target, wherein the new source is the original target and the new target is the original source, wherein the fast reverse restore command restores original data that had been copied from the original source to the original target with the instant virtual copy operation before the first background copy has been completed by the instant virtual copy operation; and
in response to receiving the fast reverse restore command,
perform a synchronous scan on the new target so that blocks of data in the cache for the new target and that existed at the time an instant virtual copy relationship was created from the original source to the original target are moved to physical storage;
update a new target structure associated with the new target using a new source structure associated with the new source by inverting indicators in the new source structure and copying the inverted indicators to the new target structure;
determine whether the new target is in a remote mirroring relationship in which the new target is a primary mirroring volume for a secondary mirroring volume;
in response to determining that the new target is in a remote mirroring relationship, update an out of sync structure associated with the new target based on values in the new target structure, wherein the out of sync structure identifies blocks of data that are to be copied from the new target to the secondary mirroring volume; and
discard blocks of data in the cache for the new target.

11. The data storage system of claim 10, wherein the fast reverse restore process is adapted to:
quiesce Input/Output (I/O) operations on the new source and the new target in response to receiving the fast reverse restore command; and
unquiesce I/O operations on the new source and the new target in response to performing the fast reverse restore command.

* * * * *